United States Patent
Lee et al.

(10) Patent No.: US 9,451,508 B2
(45) Date of Patent: Sep. 20, 2016

(54) METHOD AND APPARATUS FOR TRANSMITTING CELL INFORMATION IN WIRELESS COMMUNICATION SYSTEM

(71) Applicant: LG ELECTRONICS INC., Seoul (KR)

(72) Inventors: Jaewook Lee, Anyang-si (KR); Seungjune Yi, Anyang-si (KR); Youngdae Lee, Anyang-si (KR); Sungjun Park, Anyang-si (KR); Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/389,248

(22) PCT Filed: Apr. 30, 2013

(86) PCT No.: PCT/KR2013/003748
§ 371 (c)(1),
(2) Date: Sep. 29, 2014

(87) PCT Pub. No.: WO2013/165163
PCT Pub. Date: Nov. 7, 2013

(65) Prior Publication Data
US 2015/0065136 A1 Mar. 5, 2015

Related U.S. Application Data

(60) Provisional application No. 61/641,309, filed on May 2, 2012.

(51) Int. Cl.
*H04W 36/00* (2009.01)
*H04W 24/02* (2009.01)
*H04W 16/26* (2009.01)
*H04W 88/04* (2009.01)
*H04W 84/04* (2009.01)
*H04W 84/00* (2009.01)

(52) U.S. Cl.
CPC ......... *H04W 36/0061* (2013.01); *H04W 24/02* (2013.01); *H04W 16/26* (2013.01); *H04W 84/005* (2013.01); *H04W 84/047* (2013.01); *H04W 88/04* (2013.01)

(58) Field of Classification Search
CPC ........... H04W 36/0061; H04W 36/08; H04W 36/34; H04W 16/26; H04W 24/02; H04W 84/047; H04W 88/04
USPC .......................... 455/436–444; 370/331–338
See application file for complete search history.

(56) References Cited

U.S. PATENT DOCUMENTS 8,335,466 B2 * 12/2012 Cai et al. .......................... 455/7
2012/0315913 A1 * 12/2012 Yang et al. .................... 455/438

(Continued)

OTHER PUBLICATIONS

Chen et al., "A Secure Relay-Assisted Handover Protocol for Proxy Mobile IPv6 in 3GPP LTE Networks", WCNC, 2010, pp. 1-6.

(Continued)

*Primary Examiner* — Charles Shedrick
(74) *Attorney, Agent, or Firm* — Birch, Stewart, Kolasch & Birch, LLP

(57) ABSTRACT

A method and apparatus for transmitting mobile relay node (MRN) cell information in a wireless communication system is provided. A source donor eNodeB (DeNB) receives MRN cell information of an MRN cell from an MRN, and forwards the MRN cell information to a target DeNB when a handover procedure for the MRN is performed.

8 Claims, 12 Drawing Sheets

(56) References Cited

U.S. PATENT DOCUMENTS

| | | | |
|---|---|---|---|
| 2012/0329461 A1* | 12/2012 | Teyeb et al. | 455/437 |
| 2013/0070663 A1* | 3/2013 | Gunnarsson et al. | 370/315 |
| 2013/0077494 A1* | 3/2013 | Samdanis | 370/235 |
| 2013/0115955 A1* | 5/2013 | Deng et al. | 455/437 |
| 2013/0128866 A1* | 5/2013 | Zhang et al. | 370/331 |
| 2013/0183971 A1* | 7/2013 | Tamaki et al. | 455/436 |
| 2013/0336193 A1* | 12/2013 | Luo et al. | 370/312 |
| 2014/0080468 A1* | 3/2014 | Zhang et al. | 455/418 |
| 2015/0065136 A1* | 3/2015 | Lee et al. | 455/436 |

OTHER PUBLICATIONS

Szilagyi et al., "LTE Relay Node Self-Configuration", 12th IFIP/IEEE IM, 2011, pp. 841-855.

\* cited by examiner

UE　　　　　　　　　　E-UTRAN

UE　　　　　　　　　　E-UTRAN (a)

(b)

METHOD AND APPARATUS FOR TRANSMITTING CELL INFORMATION IN WIRELESS COMMUNICATION SYSTEM

CROSS REFERENCE TO RELATED APPLICATIONS

This application is the National Phase of PCT International Application No. PCT/KR2013/003748, filed on Apr. 30, 2013, which claims priority under 35 U.S.C. 119(e) to U.S. Provisional Application No. 61/641,309, filed on May 2, 2012. All of which are hereby expressly incorporated by reference into the present application.

TECHNICAL FIELD

The present invention relates to wireless communications, and more particularly, to a method and apparatus for transmitting cell information in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

Relaying is a technology that intermediates data between a user equipment (UE) and an eNodeB (eNB). 3GPP LTE-A (advanced) may support relaying by having a relay node (RN) wirelessly connect to an eNB serving the RN via an evolved universal terrestrial radio access (E-UTRA) radio interface. It may be referred to a section 4.7 of 3rd generation partnership project (3GPP) TS 36.300 V10.2.0 (2010-12). A relay node wirelessly communicates with an eNB supporting relay, and thus can support capacity assistance of a shadow region or coverage extension through a service for UEs located in a cell boundary region and outside the boundary region. The eNB serving the RN may be referred as a donor eNB (DeNB). The DeNB requires several additional functions for supporting relay. When there is an access of the relay node, the DeNB can perform a reconfiguration task to provide information required for relay and system information through dedicated signaling.

The RN may support eNB functionality so that the RN can be used for coverage improvement, supporting high data rate, and so on. It means that the RN terminates the radio protocols of the E-UTRA radio interface, and S1 and X2 interfaces. In addition to the eNB functionality, the RN may also support a subset of UE functionality, e.g., a physical layer, layer-2, radio resource control (RRC), and non-access stratum (NAS) functionality, in order to wirelessly connect to the DeNB. That is, the relay node can operate as a relay-type UE with respect to the DeNB, and can operate as an eNB with respect to a served UE.

The RN has two interfaces which are Un interface and Uu interface. The Un interface is a link between the eNB and the RN and the Uu interface is a link between the RN and the UE. The Un interface is a modified version of the E-UTRA radio interface. Depending on a type of the RN, whether an RN subframe configuration is required may be determined. The RN subframe refers to a downlink subframe allocated for the communication between the DeNB and the RN. If the RN subframe is necessary for the relay operation, the relay may request to the DeNB during an RRC connection setup procedure.

The RN may be classified to a fixed relay node and a mobile relay node (MRN). Recently, the MRN is considered as one of the issues in relay area. There is an increasing desire to use mobile broadband on public transportation especially on high speed trains. Providing high quality of service in fast moving environments is challenging due to challenging radio conditions as well as high and bursty signaling load. For addressing these issues, the MRN is raised as one of the solutions.

As the MRN moves, a location of a cell served by the MRN also may be changed. In this case, a physical cell identity (PCI) of the MRN cell served by the MRN may collide with a PCI of a neighbor cell.

Accordingly, a method of preventing the PCI of the MRN cell from colliding with the PCI of the neighbor cell is required.

SUMMARY OF INVENTION

Technical Problem

The present invention provides a method and apparatus for transmitting cell information in a wireless communication system. The present invention provides a method for reporting, by a mobile relay node which is moving, cell information of itself to a base station.

Solution to Problem

In an aspect, a method of transmitting, by a source donor eNodeB (DeNB), mobile relay node (MRN) cell information in a wireless communication system is provided. The method includes receiving MRN cell information of an MRN cell from an MRN, forwarding the MRN cell information to a target DeNB when a handover procedure for the MRN is performed.

The MRN cell information may be received when the MRN initially attaches to a network as a RN, or when a handover from one DeNB to another DeNB is completed, or when the MRN establishes/reestablishes a radio resource control (RRC) connection.

The MRN cell information may include at least one of physical cell identity (PCI) information of the MRN cell, an MRN indicator, a cell global identity of the MRN cell, a tracking area code, and a public land mobile network (PLMN) identity list.

The MRN cell information may be received included in one of an RRC connection setup complete message, an RRC connection reestablishment complete message, an RRC connection reconfiguration complete message, or a new uplink message.

The MRN cell information may be forwarded to the target DeNB through an X2 or an S1 interface.

In another aspect, a source donor eNodeB (DeNB) in a wireless communication system is provided. The source DeNB includes a radio frequency (RF) unit for transmitting or receiving a radio signal, and a processor coupled to the RF unit, and configured for receiving MRN cell information of an MRN cell from an MRN, forwarding the MRN cell information to a target DeNB when a handover procedure for the MRN is performed.

Advantageous Effects of Invention

A base station may acknowledge that a specific cell identity of a cell served by a mobile relay node may be the same as a cell identity of a neighbor cell. When a user equipment (UE) tries to handover to a cell having the specific cell identity, the base station may prevent the UE performing a handover procedure to a wrong cell using cell information of the mobile relay node.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
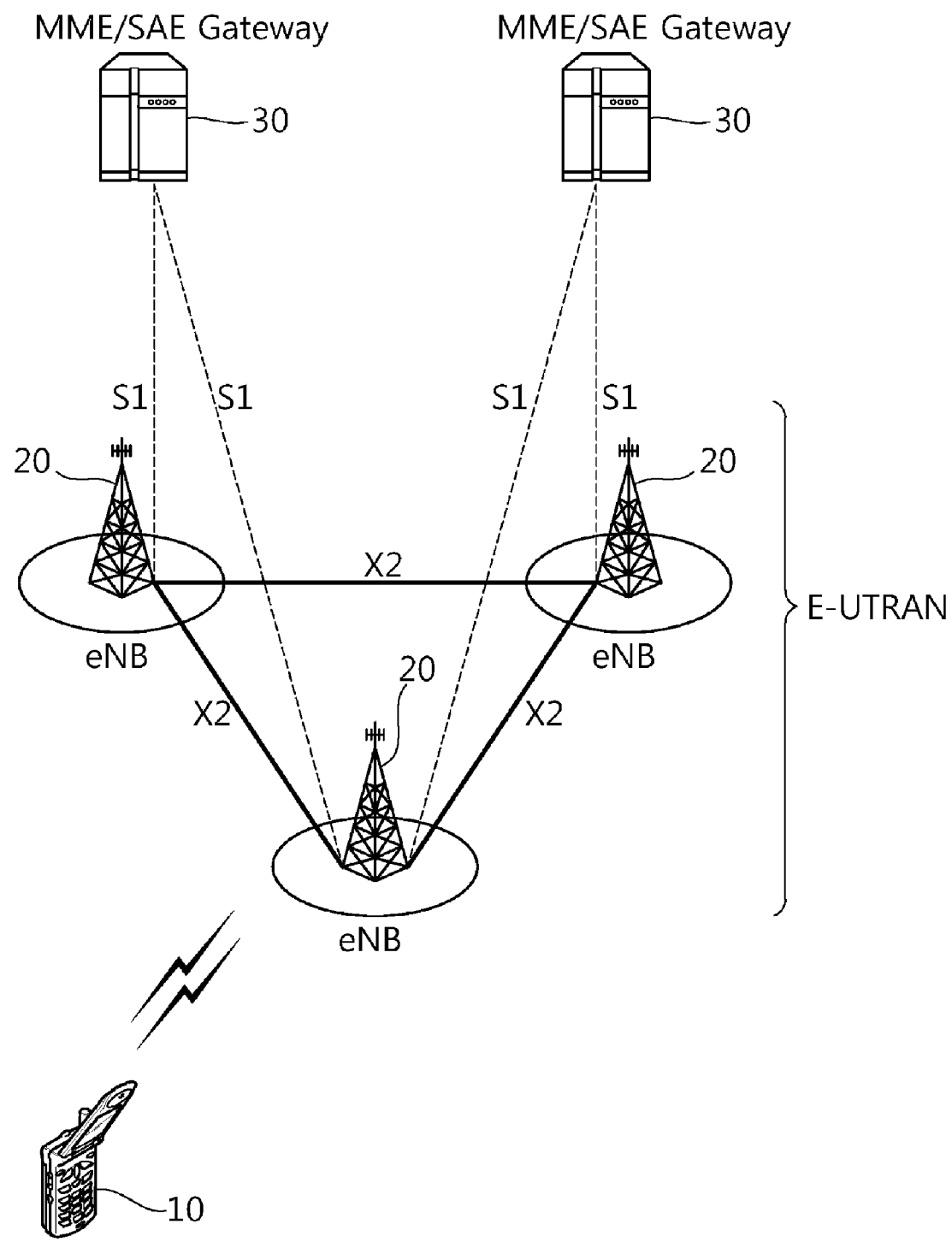
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
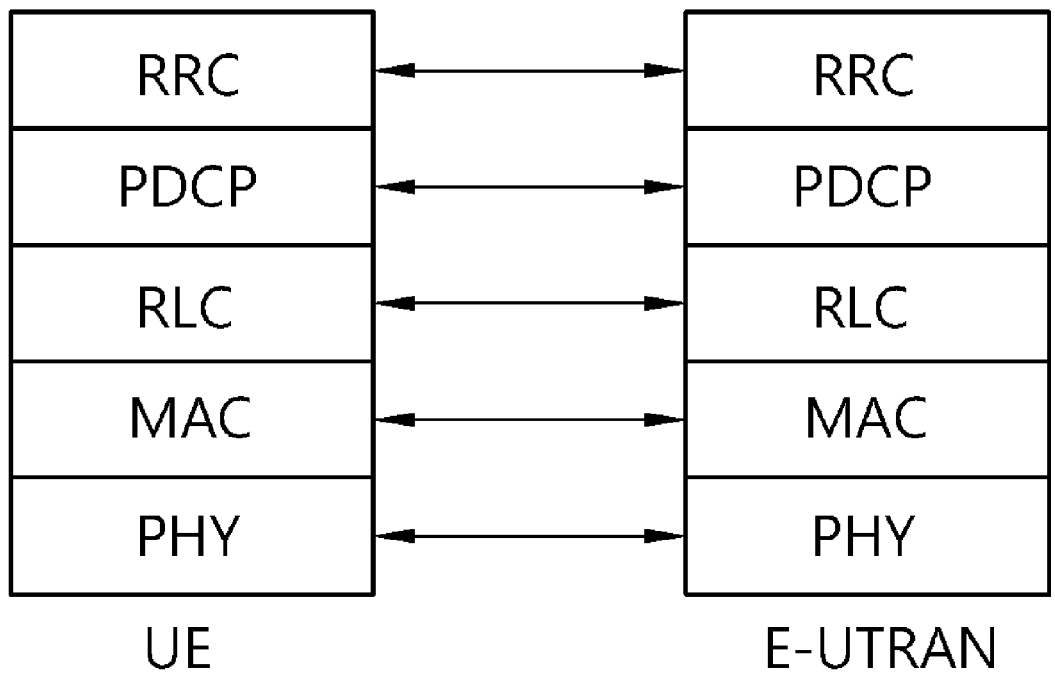
FIG. 2 is a diagram showing a radio interface protocol architecture for a control plane.
Figure 3:
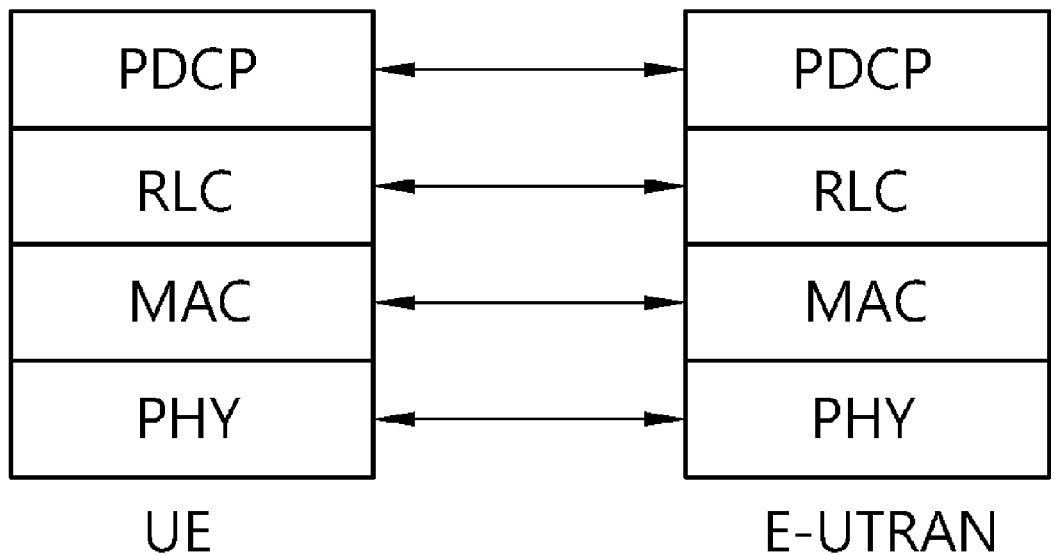
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
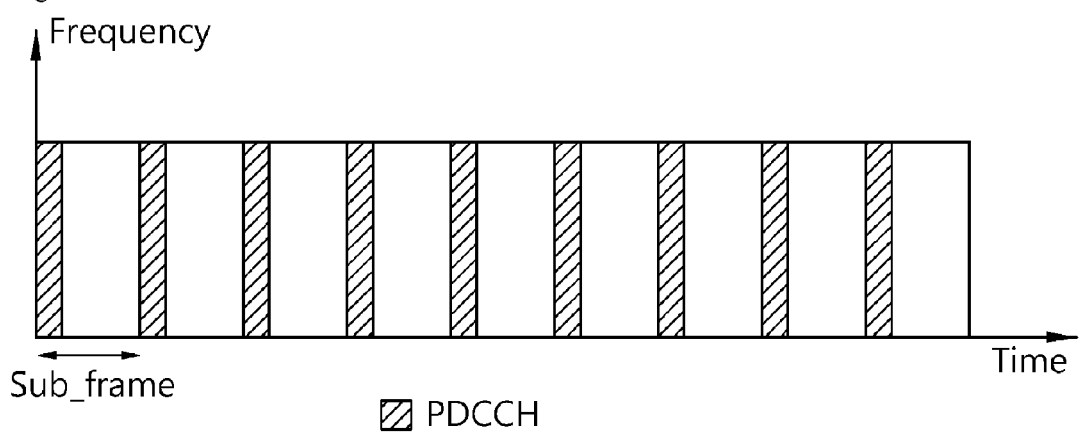
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether the RRC of the UE is logically connected to the RRC of the E-UTRAN. When an RRC connection is established between an RRC layer of the UE and an RRC layer of the network, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN can recognize the existence of the UE in RRC_CONNECTED and can effectively control the UE. Meanwhile, the UE in RRC_IDLE cannot be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE may establish the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in RRC_IDLE can persistently perform cell reselection to find a better cell. In this case, the UE can perform measurement and cell reselection by using frequency priority information. That is, the UE can determine which frequency will be preferentially considered when performing frequency measurement and cell reselection on the basis of the frequency priority information. The UE can receive the frequency priority information by using system information or an RRC connection release message, or can receive the frequency priority information from another radio access technology (RAT) in inter-RAT cell reselection.

Hereinafter, measuring and measurement reporting will be described.

It is necessary to support mobility of a UE in a mobile communication system. Therefore, the UE can persistently measure quality of a serving cell which currently provides a service and quality of a neighbor cell. The UE can report a measurement result to a network at a proper time, and the network can provide optimal mobility to the UE by using a handover or the like. For this, a base station can configure information regarding the measuring and the measurement reporting to the UE. The information regarding the measuring and measurement reporting may include a measurement object, a reporting configuration, a measurement identity, a quantity configuration, a measurement gap, etc.

Measurement object: It indicates a target for which the UE performs measurement. The target for which the UE performs measurement can be classified into three types, i.e., intra-frequency measurement for a cell having a center frequency equal to that of a serving cell, inter-frequency measurement for a cell having a center frequency different from that of the serving cell, and inter-RAT measurement for a heterogeneous network. The heterogeneous network may include a GSM/EDGE radio access network (GERAN) and a UMTS terrestrial radio access network (UTRAN) conforming to a 3GPP standard specification and a CDMA 2000 system conforming to a 3GPP2 standard specification.

Reporting configuration: It includes a reporting criterion indicating a criterion for performing measurement reporting and a reporting format indicating the content included in the measurement reporting. The reporting criterion can be classified into an event-based trigger type and a periodical-based trigger type. In the event-based trigger type, the measurement reporting is performed when a predetermined specific condition is satisfied. In the periodical-based trigger type, when the UE acquires information desired by the eNB, the information is first reported to the eNB, and thereafter reporting is performed whenever a specific time elapses. The event-based trigger type may include various events such as A1 (a case where the quality of the serving cell is better than a threshold), A2 (a case where the quality of the serving cell is worse than the threshold), A3 (a case where the quality of the neighbor cell is better than that of a PCell by an offset), A4 (a case where the quality of the neighbor cell is better than the threshold), A5 (a case where the quality of the PCell is worse than a threshold 1 and the quality of the neighbor cell is better than a threshold 2), A6 (a case where the quality of the neighbor cell is better than that of an SCell by the offset), B1 (a case where the quality of an inter-RAT neighbor cell is better than the threshold), B2 (a case where the quality of the PCell is worse than the threshold 1 and the quality of the inter-RAT neighbor cell is better than the threshold 2), etc.

Measurement identity: It indicates a linkage which links a measurement object and a reporting configuration.

Quantity configuration: It indicates information on filtering performed for the measurement result of the UE.

Measurement gap: It indicates a duration in which the UE is allowed to perform measurement. UL and DL data transmissions are not achieved in the measurement gap.

A Home (e)NodeB (H(e)NB) will be described in detail.

A mobile communication may be provided by base stations owned by an individual, a specific provider or a specific provider group other than mobile communication network providers. Such base station is called as a home NodeB (HNB) or home eNodeB (HeNB). Hereinafter, both the HNB and HeNB are commonly designated as an H(e)NB. An object of the H(e)NB is basically to provide specialized services only to a member of the CSG. However, those services may be provided to other users in addition to the CSG based on the operation mode setting of the H(e)NB.

Figure 5:
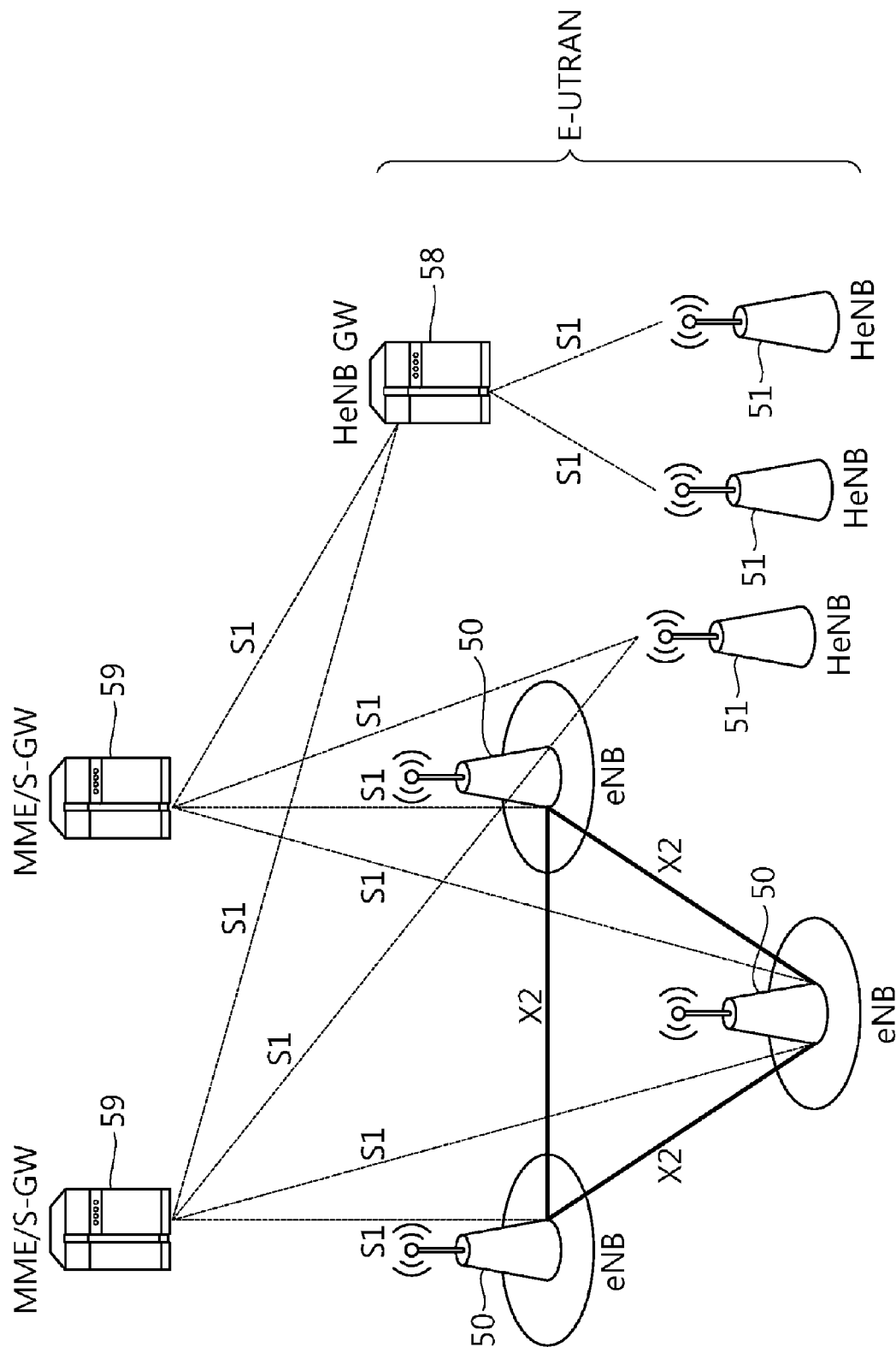
FIG. 5 shows an example of an E-UTRAN architecture for managing an HeNB by using an HeNB gateway (GW).

FIG. 5 shows an example of an E-UTRAN architecture for managing an HeNB by using an HeNB gateway (GW). It may be referred to a section 4.6.1 of 3GPP TS 36.300 V9.3.0 (2010-03).

Referring to FIG. 5, an E-UTRAN may include one or more eNB 50, one or more HeNB 51 and a HeNB GW 58. One or more E-UTRAN MME/S-GW 59 may be positioned at the end of the network and connected to an external network. The one or more eNB 50 may be connected to each other through the X2 interface. The one or more eNB 50 may be connected to the MME/S-GW 59 through the S1 interface. The HeNB GW 58 may be connected to the MME/S-GW 59 through the S1 interface. The one or more HeNB 51 may be connected to the HeNB GW 58 through the S1 interface or may be connected to the MME/S-GW 59 through the S1 interface. The one or more HeNB 51 may not be connected to each other.

As described in FIG. 5, the E-UTRAN may manage HeNB GW 58 for serving one or more HeNB 51. HeNBs may be connected to an EPC via an HeNB GW or directly connected to the EPC. Here, the HeNB GW is regarded as a normal BS to MME. Also, the HeNB GW is regarded as the MME to the HeNB. Therefore, an S1 interface is connected between the HeNB and the HeNB GW, and also an S1 interface is connected between the HeNB GW and the EPC. Furthermore, even in case of directly connecting between the HeNB and the EPC, it is connected via an S1 interface. The function of the HeNB is almost similar to the function of a normal BS.

In general, an H(e)NB has a low radio transmission output power compared to the BS owned by mobile communication service providers. Therefore, the service coverage provided by the H(e)NB is typically smaller than the service coverage provided by a (e)NB. Due to such characteristics, the cell provided by the H(e)NB is classified as a femto cell in contrast to a macro cell provided by the (e)NB from a standpoint of the service coverage. From a standpoint of provided services, when the H(e)NB provides those services only to a closed subscriber group (CSG), the cell provided by this H(e)NB is referred to as a CSG cell.

Each CSG may have its own identifier which is called a CSG ID (CSG identity). The UE may have a CSG list to which the UE itself belongs as a member thereof, and this CSG list may be changed by a request of the UE or a command of the network. This list is called as a CSG whitelist. Generally, one H(e)NB may support one CSG.

The H(e)NB may deliver the CSG ID of the CSG being supported by itself through system information, thereby allowing only the corresponding CSG member UE to be accessed. When a CSG cell is found by the UE, the UE may check which type of CSG is supported by this CSG cell by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG whitelist.

It is not always required for H(e)NB to allow the CSG UE to be accessed. Based on a configuration setting of H(e)NB, non-CSG member UE may be allowed to be accessed. The type of the UE allowed to be accessed may be changed based on the configuration setting of H(e)NB. Here, the configuration setting denotes a setting of the access mode (or may be called as operation mode) of H(e)NB. The operation mode of H(e)NB can be divided into three types as follows based on to which type of the UE the H(e)NB provides a service.

1) Closed access mode: A mode in which services are provided to particular CSG members only. A CSG cell is provided by the H(e)NB.

2) Open access mode: A mode in which services are provided without any restriction of particular CSG members like normal (e)NB. The H(e)NB provides a normal cell not a CSG cell. For clarity, a macro cell is a cell operated by the open access mode.

3) Hybrid access mode: A mode in which CSG services are provided to particular CSG members and also services are provided to non-CSG members like a normal cell. It is recognized as a CSG cell for the CSG member UE, and recognized as a normal cell for the non-CSG member UE. This cell is called a hybrid cell.

The H(e)NB notifies the UE that the cell being serviced by itself is a CSG cell or a normal cell, allowing the UE to know whether or not it can be accessed to the corresponding cell. The H(e)NB being operated in a closed access mode broadcasts via the system information that it is a CSG cell. In this manner, the H(e)NB allows the system information to include a CSG indicator, which has a size of 1 bit, indicating whether or not the cell being serviced by itself is a CSG cell in the system information. For example, the CSG cell broadcasts by setting the CSG indicator to 'TRUE'. If the cell being serviced is not a CSG cell, then the CSG indicator may be set to 'FALSE' or the transmission of the CSG indicator may be omitted. The UE shall distinguish a normal cell from a CSG cell, and thus a normal BS may also transmit the CSG indicator (for example, the CSG indicator set to 'FALSE'), thereby allowing the UE to know that the cell type provided by itself is a normal cell. Furthermore, the normal BS may not transmit the CSG indicator, thereby allowing the UE to know that the cell type provided by itself is a normal cell, too.

Table 1 show CSG-related parameters transmitted by the corresponding cell, included in the system information, for each cell type.

TABLE 1

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

Table 2 shows types of the UE allowed to be accessed for each cell type.

TABLE 2

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Figure 6:
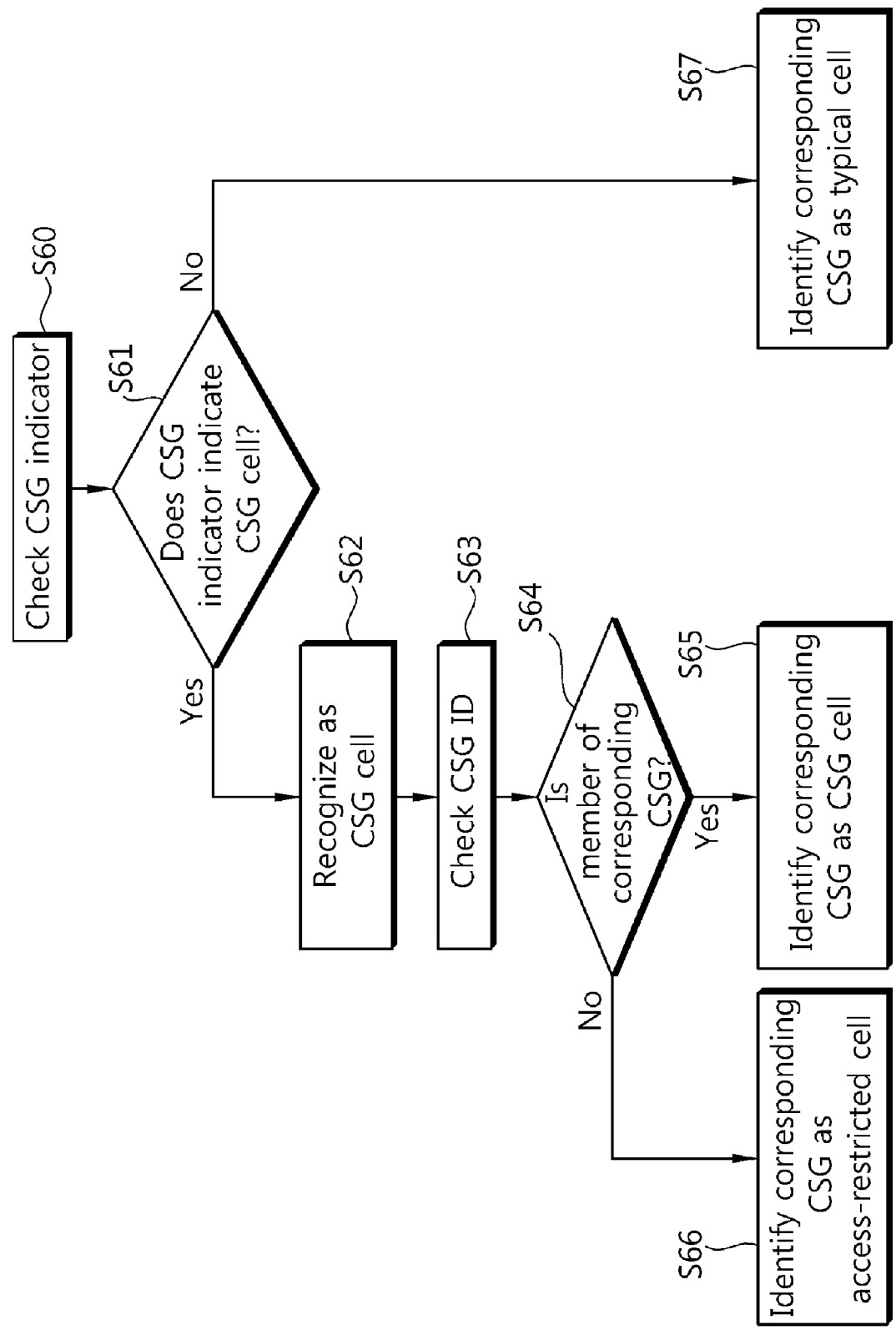
FIG. 6 shows an example of a method of checking an access mode of a base station by a UE.

FIG. 6 shows an example of a method of checking an access mode of a base station by a UE.

At step S60, the UE checks a CSG indicator in system information of a target cell in order to confirm which type the target cell is.

After checking the CSG indicator, the UE determines whether the CSG indicator indicates that the target cell is a CSG Cell at step S61. If the CSG indicator indicates that the target cell is a CSG cell, then the UE recognizes the corresponding cell as the CSG cell at step S62.

At step S63, the UE checks the CSG ID in the system information in order to check whether or not the UE itself is a CSG member of the target cell. At step S64, the UE determines whether the UE is a member of the corresponding CSG cell. If it is checked from the CSG ID that the UE is a CSG member of the target cell, then the corresponding cell will be recognized as an accessible CSG cell at step S65. If it is checked from the CSG ID that the UE is not a CSG member of the target cell, then the corresponding cell will be recognized as an inaccessible CSG cell at step S66.

If the CSG indicator indicates that the target cell is not a CSG cell at step S61, then the UE recognizes the target cell as a normal cell at step S67. Furthermore, if the CSG indicator is not transmitted at step S60, the UE recognizes the target cell as a normal cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve specific physical layer cell identifiers for the CSG cell in a mixed carrier frequency. The physical layer cell identifier is called as a physical cell identity (PCI) in the E-UTRAN, and called as a physical scrambling code (PSC) in the UTRAN. For clarity, the physical layer cell identifier will be expressed by the PCI. The CSG cell notifies information on the PCI reserved for the CSG cell at a current frequency via the system information. The UE that received this information can determine whether or not this cell is a CSG cell from the PCI of the cell when a certain cell is found at the corresponding frequency. How this information being used by the UE will be illustrated below in case of two types of UE.

A UE not supporting the CSG-related function or having no CSG list to which the UE itself belongs: the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for the CSG. Typically, the PCI of a certain cell may be immediately known during a process of checking the existence of the corresponding cell in a physical layer by the UE.

A UE having a CSG list to which the UE itself belongs: when the UE wants to know a list of the neighboring CSG cells at a mixed carrier frequency, it may be known that the corresponding cell is a CSG cell if only a cell having the PCI reserved for CSG is found, instead of individually checking the CSG identity of the system information of every cell found in the whole PCI range.

A cell reselection procedure related to a CSG cell will be described.

A CSG cell is a cell for providing better-quality services, i.e., CSG services, to its member UEs. Since the UE may be typically serviced with better quality of service (QoS) in a CSG cell than in non-CSG cell, when the UE camps on the CSG cell, the selection of another cell may not be appropriate in terms of QoS even if an inter-frequency of a higher priority than a serving frequency is found.

In order to prevent a cell at an inter-frequency of a higher priority than a serving frequency from being selected over a serving CSG cell during the cell reselection procedure, a UE may assume the serving frequency to have the highest priority of all other frequencies as long as the serving CSG cell is evaluated as the best-ranked cell on the corresponding frequency. When the UE gives the highest priority to a specific frequency without any explicit network signaling, this frequency priority may be called as an implicit highest priority. In this manner, it is possible to help the UE camp on the CSG cell as much as possible without violating the existing cell reselection rule that cell reselection is performed based on the priorities of frequencies.

Figure 7:
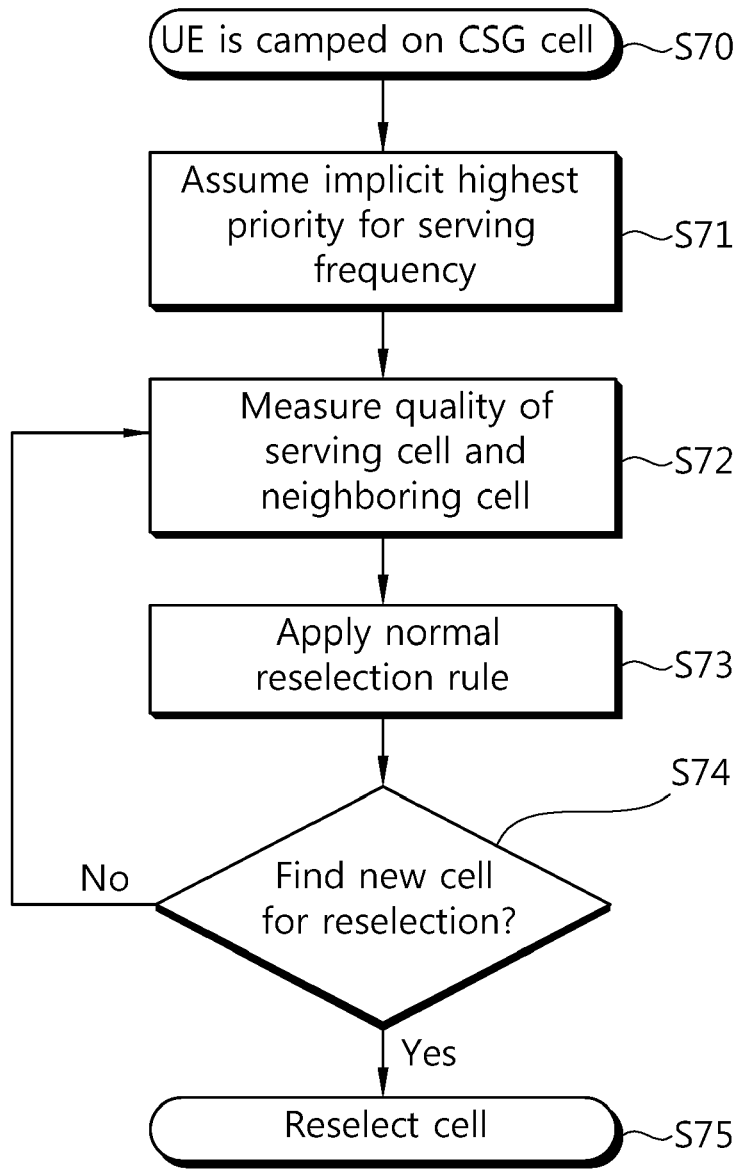
FIG. 7 shows an example of a cell reselection procedure when a UE camps on a CSG cell.

FIG. 7 shows an example of a cell reselection procedure when a UE camps on a CSG cell.

At step S70, the UE camps on a CSG cell.

Since a serving cell of the UE is the CSG cell, an implicit highest priority may be assigned to a serving frequency at step S71.

At step S72, the UE may measure the quality of the serving CSG cell and a neighboring cell.

At step S73, the UE may apply a normal reselection rule based on the measurement results performed at step S72. More specifically, the UE may search a best ranked cell in a frequency of a higher priority than the serving frequency. If no best-ranked cell is found from the frequency of a higher priority than the serving frequency, the UE may search the best ranked cell in a frequency having the same priority as that of the serving frequency. If no best-ranked cell is found from the frequency having the same priority as that of the serving frequency, the UE may search the best ranked cell in a frequency of a lower priority than the serving frequency.

If a new cell is found at step S74, the UE may reselect the new cell at step S75. If a new cell is not found at step S74, the UE may measure the quality of the serving CSG cell and a neighboring cell again.

If the reselected cell is a non-CSG cell, the UE may withdraw the implicit highest priority assigned to the serving CSG cell, and may use frequency priorities provided by a network for cell reselection.

If the UE finds a new best-ranked CSG cell from a frequency having the same priority as that of the serving frequency, the UE may decide whether to stay in the current serving CSG cell or reselect the new best-ranked CSG cell according to an implementation of the UE.

An inbound mobility procedure for the CSG will be described.

The inbound mobility is a handover from a macro cell to a CSG cell. The inbound mobility procedure has two objects. The first object of the inbound mobility procedure is to solve PCI/PSC confusion. The second object of the inbound mobility procedure a preliminary access check which is a process to pre-recognize whether the UE is a member or non-member of a CSG cell to which the UE intends to move. The PCI/PSC confusion is caused when one or more H(e) NBs share the same PCI/PSC due to PCI/PSC shortage in a case where many CSG cells are installed. In this case, the network does not know to which cell the network make the UE be handed over. In order to reduce a handover failure, the inbound mobility procedure needs to consider the PCI confusion and the preliminary access check. For this, the UE has to be able to read system information of a target cell before a handover and has to be able to transmit necessary information to the network.

Figure 8:
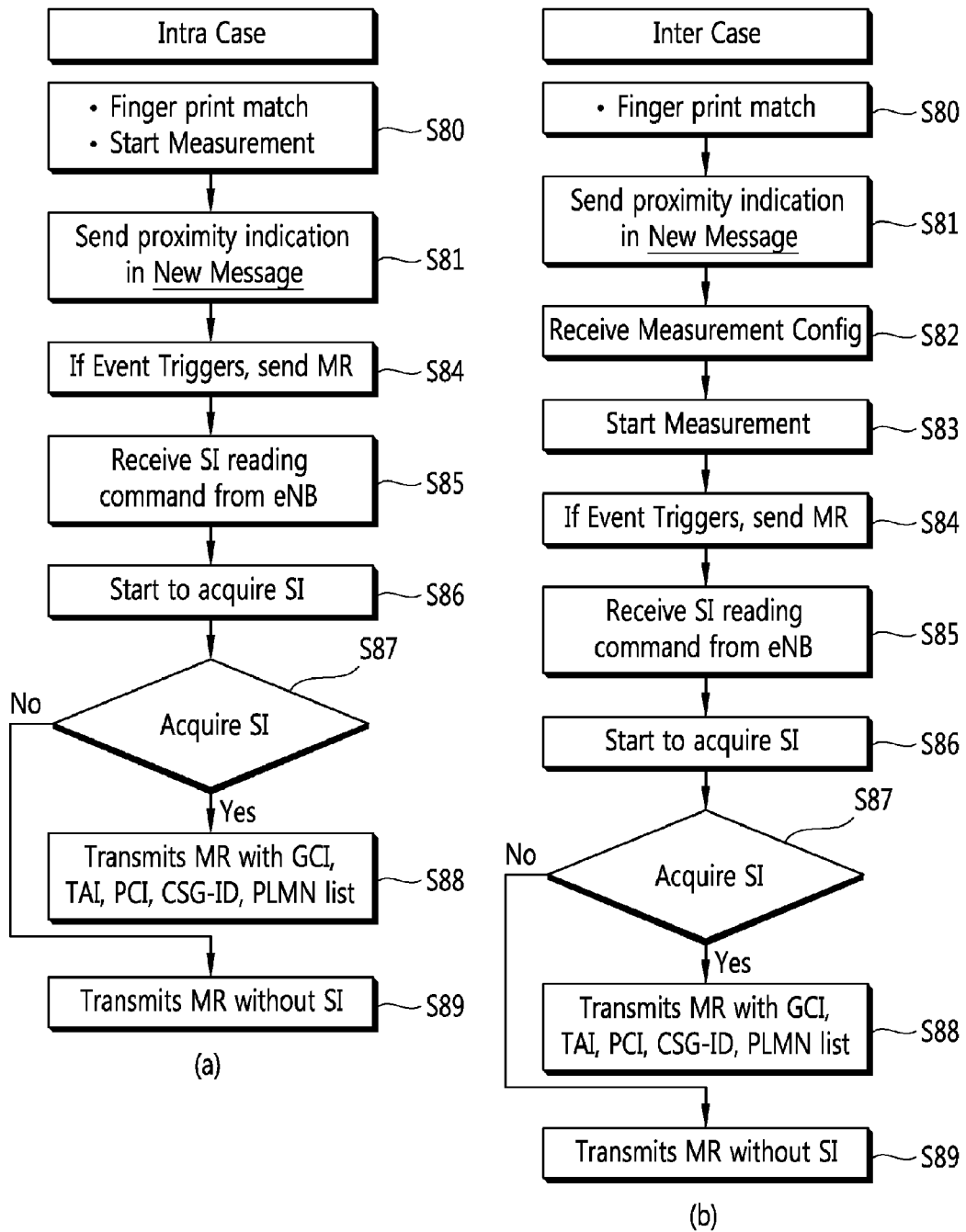
FIG. 8 shows an example of an inbound mobility procedure.

FIG. 8 shows an example of an inbound mobility procedure.

In an intra-frequency inbound motility procedure, the UE performs a finger print matching and starts measurement at step S80. At step S81, the UE transmits a proximity indication in a new message. The proximity indication informs the network that the UE had been handed over to the corresponding CSG cell previously. At step S84, if event triggers, the UE transmits a measurement report. At step S85, the UE receives a system information reading command from an eNB. At step S86, the UE starts to acquire system information. At step S87, the UE determines whether to acquire the system information. If the UE acquire the system information, the UE transmits the measurement report with a global cell identifier (GC), a tracking area identifier (TAI), a PCI, a CSI ID, and a public land mobile network (PLMN) list at step S88. If the UE does not acquire the system information, the UE transmits the measurement report without the system information at step S89.

In an inter-frequency inbound motility procedure, the UE performs a finger print matching at step S80. At step S81, the UE transmits a proximity indication in a new message. The proximity indication informs the network that the UE had been handed over to the corresponding CSG cell previously. At step S82, the UE receive a measurement configuration using the proximity indication. At step S83, the UE starts measurement. At step S84, if event triggers, the UE transmits a measurement report. At step S85, the UE receives a system information reading command from an eNB. At step S86, the UE starts to acquire system information. At step S87, the UE determines whether to acquire the system information. If the UE acquire the system information, the UE transmits the measurement report with a global cell identifier (GC), a tracking area identifier (TAI), a PCI, a CSI ID, and a public land mobile network (PLMN) list at step S88. If the UE does not acquire the system information, the UE transmits the measurement report without the system information at step S89.

In a UTRAN inter-frequency handover procedure, the UE can read the system information without a command of the network.

Relaying and a mobile relay node will be described.

Figure 9:
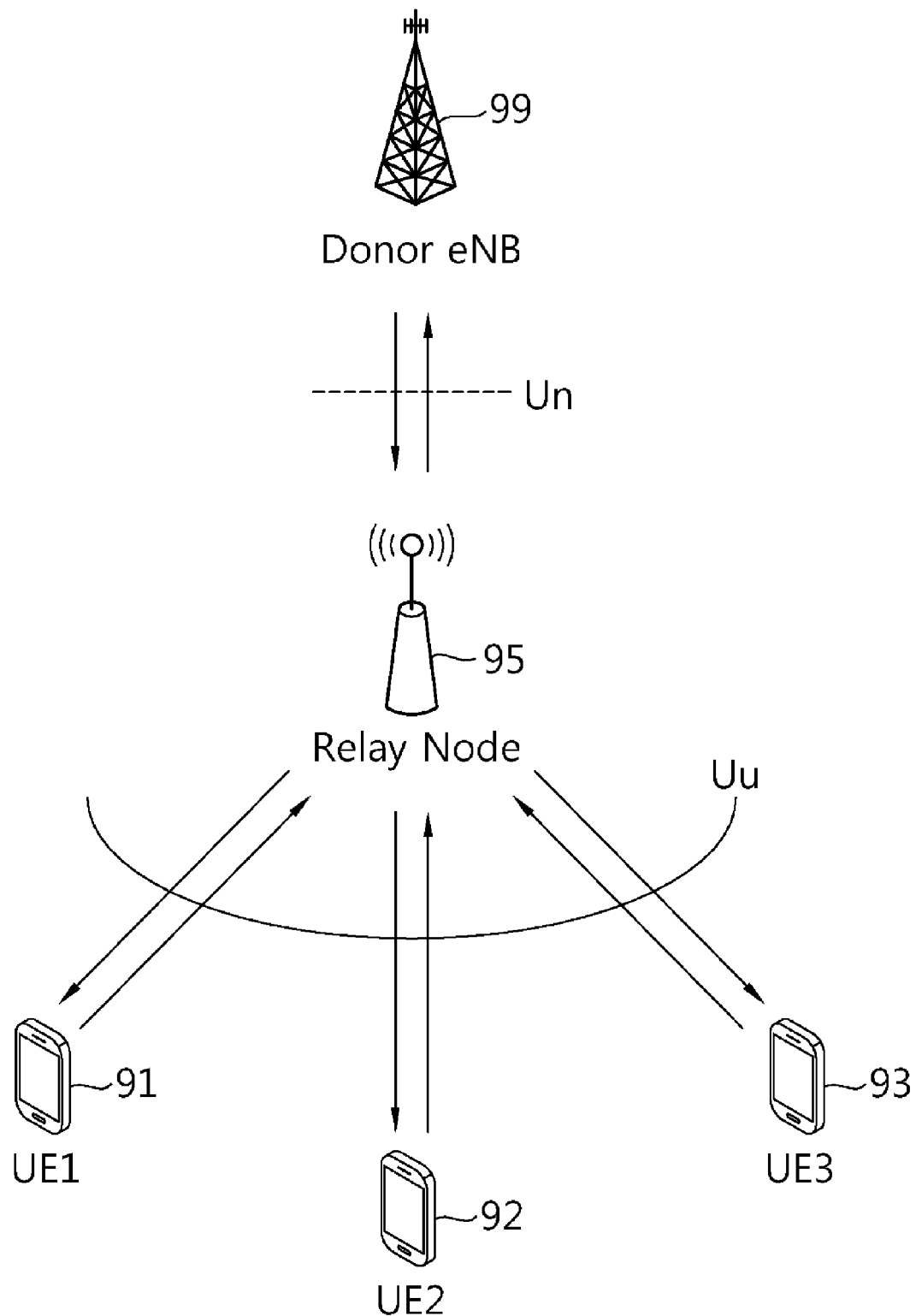
FIG. 9 shows an example of deployment of a relay node.

FIG. 9 shows an example of deployment of a relay node.

Referring to FIG. 9, UE1 91, UE2 92, and UE3 93 are connected to a relay node (RN) 95 through a Uu interface. The relay node 95 is connected to a donor eNB (DeNB) 99 through a Un interface. The UE1 91, UE2 92, and UE3 93 may transmit data to the DeNB 99 or receive data from the DeNB 99 via the RN 95.

The RN 95 may manage the UE1 91, UE2 92, and UE3 93 instead of the DeNB 99. That is, from a position of the UE1 91, UE2 92, and UE3 93, the RN 95 is seen as a DeNB. Therefore, the Uu interface between the UE1 91, UE2 92, UE3 93, and the RN 95 may use conventional Uu interface protocol such as MAC/RLC/PDCP/RRC used in the 3GPP LTE.

From a position of the DeNB 99, the RN 95 may be seen as a UE or an eNB according to a situation. When the RN 95 accesses to the DeNB 99 initially, the RN 95 performs a random access, like a UE, because the DeNB 99 does not know the presence of the RN 95. After the RN 95 accesses to the DeNB 99, the RN 95 may operates as an eNB which manages UEs connected to the DeNB 99. Therefore, the Un interface protocol may be defined as the Uu interface protocol with a network protocol functionality.

The RN may be classified into an inband RN and an outband RN according to radio resources (e.g., frequency) used by the Un interface and the Uu interface. The inband RN is a relay node that the Un interface and the Uu interface use the same frequency. In this case, subframes for the Un interface and the Uu interface may be allocated respectively for avoiding interference between the Un interface and the Uu interface each other. The outband RN is a relay node that the Un interface and the Uu interface use different frequencies. In this case, there is no need to consider interference between the Un interface and the Uu interface.

An MRN is a relay node having mobility. The MRN is typically installed at a mass transportation with a high speed. The MRN may be mounted on the top of a train and serves UEs inside carriages.

Figure 10:
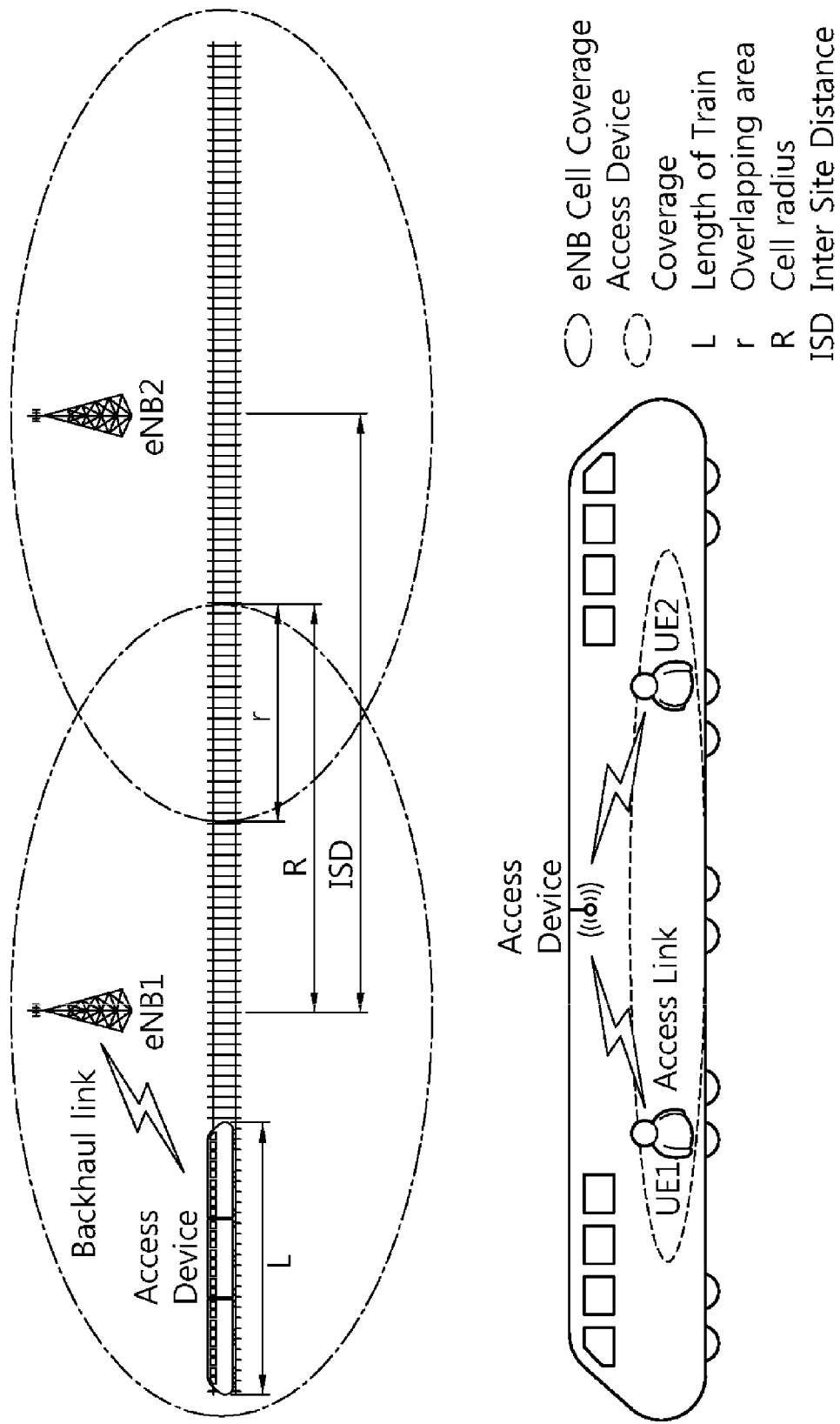
FIG. 10 shows an example of deployments scenario of a MRN at a high speed train.

FIG. 10 shows an example of deployments scenario of a MRN at a high speed train.

Referring to FIG. 10, the MRN is installed in a high speed train. User equipments in the high speed train do not move or move at a speed of a. Coverage of the MRN may correspond to the entirety of the high speed train or each of cars constituting the high speed train. The MRN may communicate with UEs in the high speed train through an access link. At present, the MRN is in coverage of an eNB1 supporting relay. The mobile relay node may communicate with the eNB1 through a backhaul link. When the high speed train moves, the MRN may enter coverage of an eNB2 supporting relay. Accordingly, the MRN can be handed over from the eNB1 to the eNB2.

As the high speed train moves across cells along a railway, the MRN mounted on the high speed trains also moves and a location of a cell of the MRN (hereinafter MRN cell) also may be changed. Accordingly, a PCI of the MRN cell may collide with PCIs of neighboring cells served by eNBs along a track or MRNs mounted on other trains that may meet somewhere. The PCI collision problem may cause a handover reducing a QoS of the UE.

Figure 11:
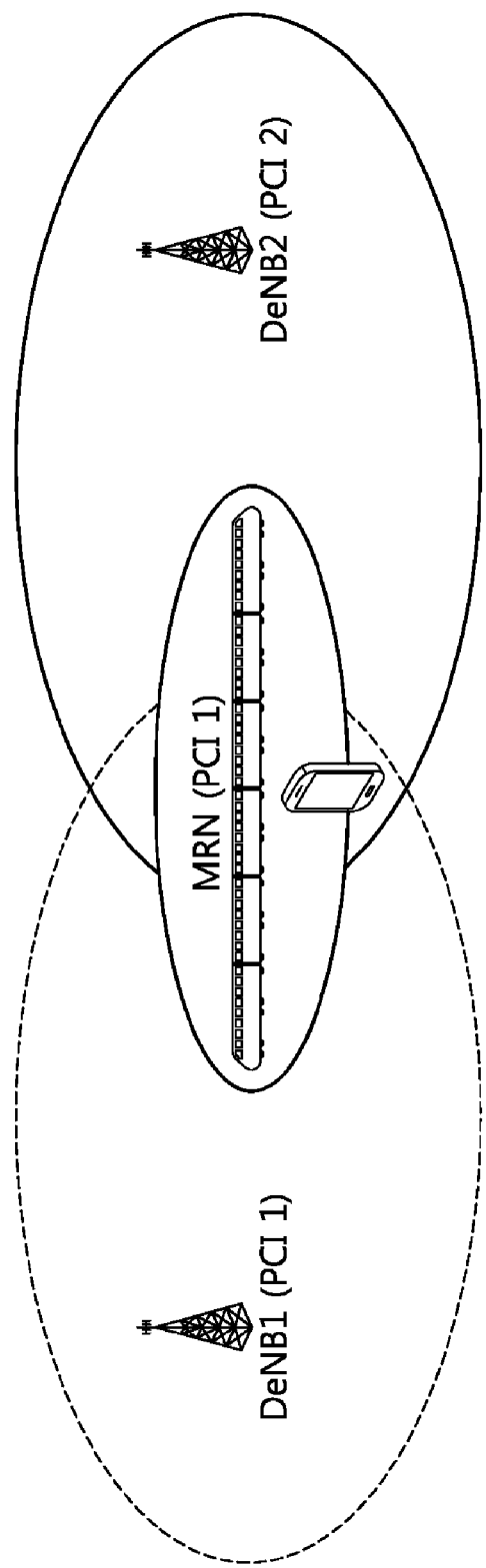
FIG. 11 shows an example of a PCI collision problem.

FIG. 11 shows an example of a PCI collision problem.

Referring to FIG. 11, a cell of a DeNB1 and an MRN cell have same PCI (PCI1). The MRN is currently in coverage of a cell of a DeNB2. A UE is currently served by the DeNB2 and moving towards the cell of the DeNB1 and the MRN cell. The UE gets on a train on which the MRN is mounted. A desirable behavior of the DeNB2 is to handover the UE to the MRN. However, since the DeNB2 does not know a cell identity of the MRN cell, it may handover the UE to the DeNB1 when the UE reports measurement results with the PCI1 to the DeNB 2. This may result in a handover failure or call drop.

Figure 12:
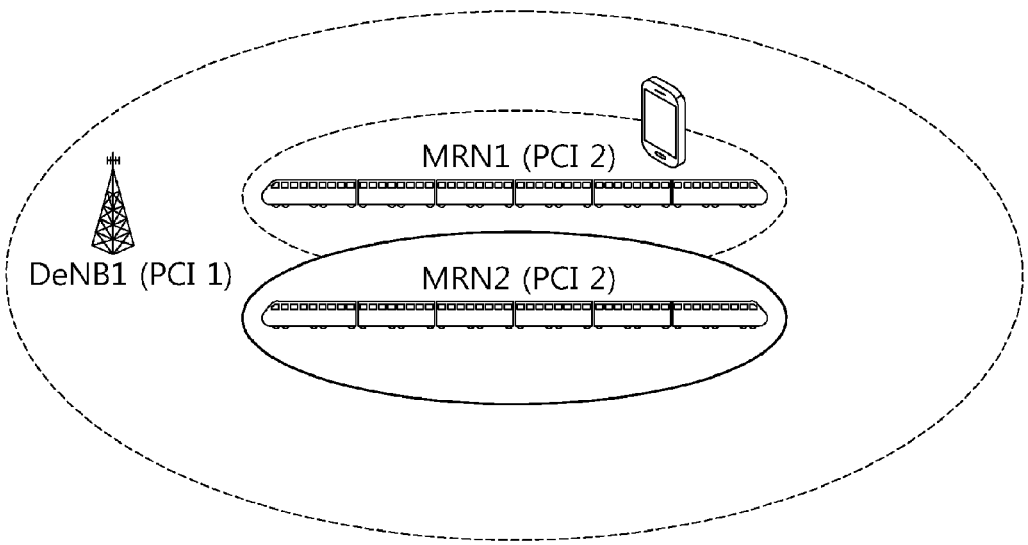
FIG. 12 shows another example of a PCI collision problem.

FIG. 12 shows another example of a PCI collision problem.

Referring to FIG. 12, two MRNs have same PCI (PCI2) and a UE is currently served by a DeNB1. The UE gets on a train on which an MRN1 is mounted. A desirable behavior of a source DeNB (DeNB1) is to handover the UE to the MRN1. However, the DeNB1 does not know there is a PCI collision problem so that it is possible for the DeNB1 to handover the UE to the MRN2. This also may result in a handover failure and call drop.

As described above, The PCI collision problem described above makes a handover procedure a little more complex since a DeNB does not know the exact target as in the HeNB inbound handover procedure. Further steps to resolve the PCI collision problem from the DeNB point of view may be required. That is, it is required that an additional procedure for acquiring, for the DeNB, cell identifiers other than the PCI, like CSG cells, for determining to which cell the DeNB handover the UE between the MRN cell and a cell having the same PCI as the MRN cell. The PCI of the CSG cell may be restricted among PCIs reserved for CSG cells. Accordingly, in case of CSG cells, upon checking the PCI with measurement reports received from the UE, the DeNB may determine whether an additional cell identification procedure is needed or not. On the other hand, there is no restricted PCI range for the MRN. Since the MRN may have the same PCI as a macro cell, the DeNB does not acknowledge whether an additional cell identification procedure is needed or not, even if the DeNB checks the PCI with measurement reports received from the UE. The DeNB does not know whether there is any possibility for the PCI collision problem. Consequently, the DeNB may not consider further steps to resolve the PCI collision problem.

Accordingly, in order to avoid the PCI collision problem described above, it may be proposed that a method of making, by an MRN, a network knows MRN cell information of an MRN cell so that a DeNB is able to determine whether there is possible PCI collision between a cell of a DeNB and the MRN cell or between MRN cells.

The MRN may notify the DeNB of the MRN cell information when:
 the MRN initially attaches to the network as a RN;
 the handover from one DeNB to another DeNB (inter-eNB handover) is completed; or
 the MRN establishes/reestablishes an RRC connection.

The MRN cell information may include at least one of followings:
 PCI information of MRN cell
 MRN indicator: This means the cell is of the cell of the MRN
 Cell global identity of MRN cell
 Tracking area code
 PLMN identity list Following messages may be used for transmission of the MRN cell information.
 RRCConnectionSetupComplete
 RRCConnectionReestablishmentComplete
 RRCConnectionReconfigurationComplete
 Other new UL messages Upon receiving the MRN cell information from the MRN, the DeNB may forward the MRN cell information to a target DeNB through X2 interface or S1 interface when the handover for the MRN is performed.

Figure 13:
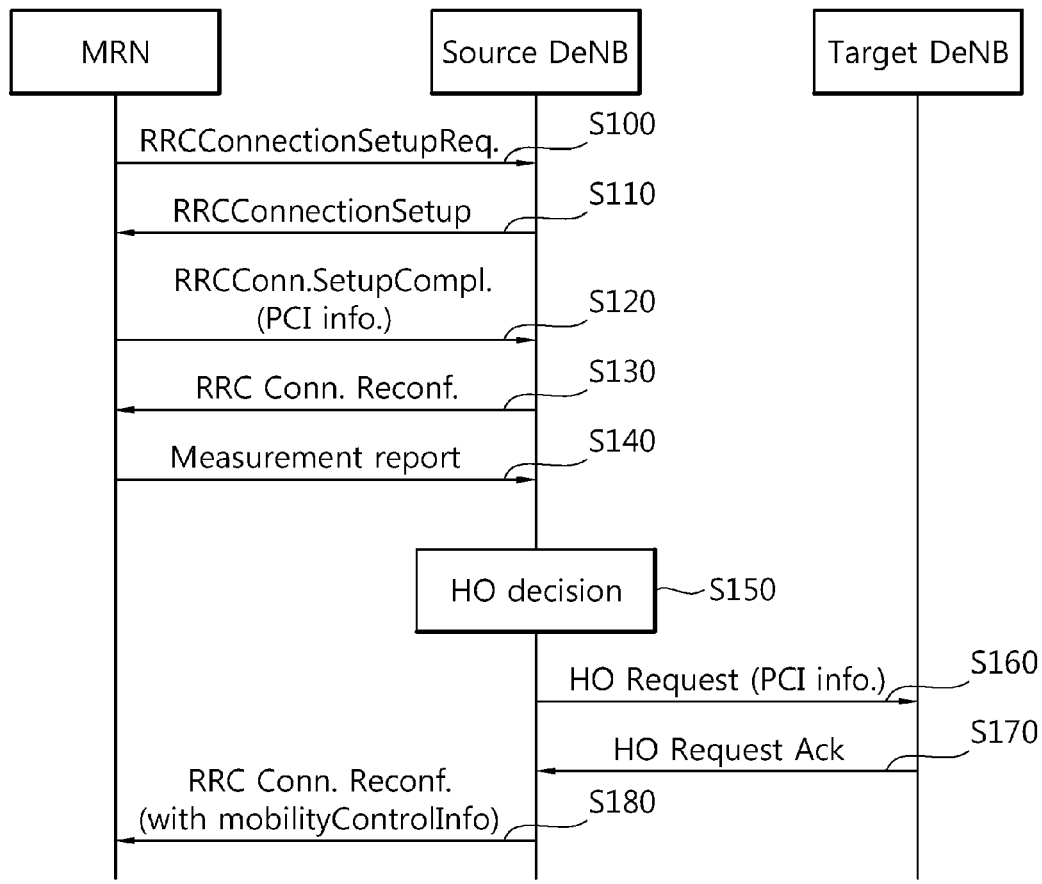
FIG. 13 shows an example of a method for transmitting MRN cell information according to an embodiment of the present invention.

FIG. 13 shows an example of a method for transmitting MRN cell information according to an embodiment of the present invention.

A MRN performs an RRC connection setup procedure with a source DeNB by transmitting an RRC connection setup message to the source DeNB at step S100, and receiving an RRC connection setup response message from the source DeNB at step S110.

At step S120, upon receiving the RRC connection setup response message, the MRN transmits an RRC connection setup complete message to the source DeNB. In this case, the RRC connection setup complete message may include MRN cell information of a MRN cell. The MRN cell information may include a PCI of the MRN cell.

At step S130, the source DeNB transmits an RRC connection reconfiguration message to the MRN. At step S140, the MRN measures neighbor cells based on the received RRC connection reconfiguration message, and transmits a measurement report to the source DeNB if a result of the measurement satisfies a specific condition. At step S150, the source DeNB determines whether to handover the MRN to a target DeNB based on the received measurement report.

If the source DeNB determines to handover the MRN to the target DeNB, the source DeNB transmits a handover request message to the target DeNB at step S160. The handover request message may include the MRN cell information received from the MRN. That is, the source DeNB may forward the MRN cell information received from the MRN to the target DeNB.

At step S170, the target DeNB transmits a handover request acknowledge message to the source DeNB to a response of the handover request message. At step S180, the source DeNB transmits an RRC connection reconfiguration message including mobility control information to the MRN. Accordingly, the MRN may be handed over to the target DeNB.

Figure 14:
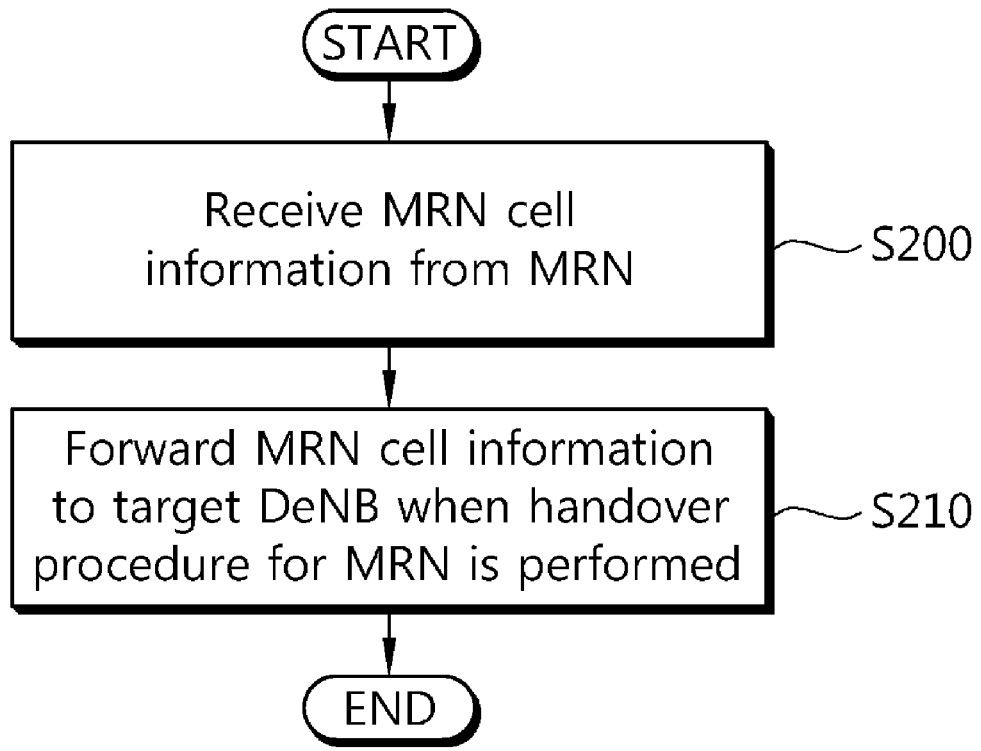
FIG. 14 shows another example of a method for transmitting MRN cell information according to an embodiment of the present invention.

FIG. 14 shows another example of a method for transmitting MRN cell information according to an embodiment of the present invention.

At step S200, the source DeNB receives MRN cell information of an MRN cell from a MRN. The source DeNB receives the MRN cell information when the MRN initially attaches to the network as a RN, when the handover from one DeNB to another DeNB (inter-eNB handover) is completed, or when the MRN establishes/reestablishes an RRC connection. In addition, the MRN cell information may include at least one of PCI information of the MRN cell, an MRN indicator, a cell global identity of MRN cell, a tracking area code, and a PLMN identity list.

At step S210, the source DeNB forwards the MRN cell information to target DeNB when a handover procedure for the MRN is performed.

Figure 15:
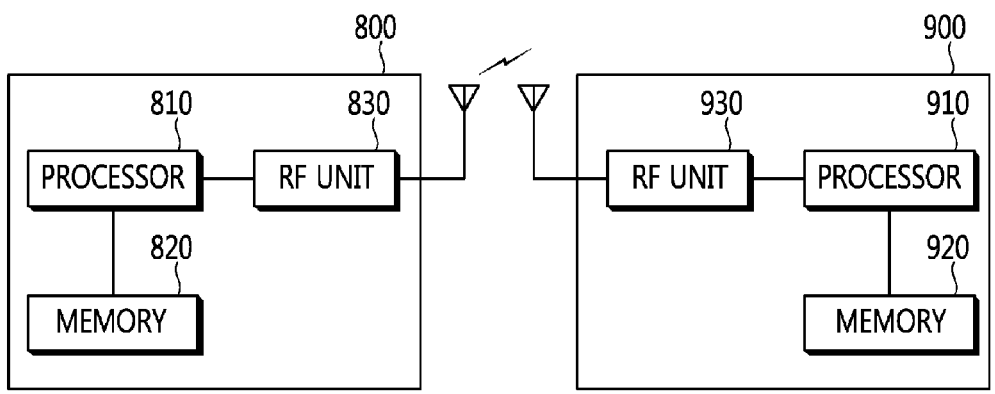
FIG. 15 is a block diagram showing wireless communication system to implement an embodiment of the present invention.

FIG. 15 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A relay node 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method of transmitting, by a source donor eNodeB (DeNB), mobile relay node (MRN) cell information in a wireless communication system, the method comprising:
   receiving a first measurement result with respect to an MRN having a first physical cell identity (PCI) and information on the first PCI from a user equipment (UE);
   when the MRN enters a coverage of the source DeNB, receiving MRN cell information from the MRN, wherein the MRN cell information includes an indicator indicating the MRN supports mobility and includes the first PCI;
   receiving a second measurement result with respect to a target DeNB having a second PCI and information on the second PCI from the MRN;
   determining to initiate a handover procedure of the UE from the source DeNB to one of the MRN and the target DeNB by using at least one of the first measurement result, the first PCI, the second measurement result, the second PCI and the indicator,
   wherein the first PCI is identical to the second PCI; and
   forwarding the MRN cell information to the target DeNB.

2. The method of claim 1, wherein the MRN cell information is included in one of a radio resource control (RRC) connection setup complete message, an RRC connection reestablishment complete message, an RRC connection reconfiguration complete message, or a new uplink message.

3. The method of claim 1, wherein the MRN cell information is forwarded to the target DeNB through an X2 interface or an S1 interface.

4. The method of claim 1, wherein the MRN cell information is forwarded to the target DeNB via a handover request message.

5. A source donor eNodeB (DeNB) in a wireless communication system, the source DeNB comprising:
   a radio frequency (RF) unit configured to transmit and receive a radio signal; and
   a processor coupled to the RF unit and configured to:
      receive a first measurement result with respect to a mobile relay node (MRN) having a first physical cell identity (PCI) and information on the first PCI from a user equipment (UE),
      when the MRN enters a coverage of the source DeNB, receive MRN cell information from the MRN, wherein the MRN cell information includes an indicator indicating the MRN supports mobility and includes the first PCI, receive a second measurement result with respect to a target DeNB having a second PCI and information on the second PCI from the MRN, determine to initiate a handover procedure of the UE from the source DeNB to one of the MRN and the target DeNB by using at least one the first measurement result, the first PCI, the second measurement result, the second PCI and the indicator, wherein the first PCI is identical to the second PCI, and forward the MRN cell information to the target DeNB.

6. The source DeNB of claim 5, wherein the MRN cell information is included in one of a radio resource control (RRC) connection setup complete message, an RRC connection reestablishment complete message, an RRC connection reconfiguration complete message, or a new uplink message.

7. The source DeNB of claim 5, wherein the MRN cell information is forwarded to the target DeNB through an X2 interface or an S1 interface.

8. The source DeNB of claim 5, wherein the MRN cell information is forwarded to the target DeNB via a included in a handover request message.

* * * * *